United States Patent
Murouchi et al.

(10) Patent No.: US 7,291,238 B2
(45) Date of Patent: Nov. 6, 2007

(54) METHOD OF MANUFACTURING LIQUID CRYSTAL DISPLAY PANEL AND LIQUID CRYSTAL DISPLAY PANEL MANUFACTURING APPARATUS

(75) Inventors: Katsunori Murouchi, Honjo (JP); Masashi Tatsukawa, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 487 days.

(21) Appl. No.: 10/867,680

(22) Filed: Jun. 16, 2004

(65) Prior Publication Data

US 2004/0257521 A1    Dec. 23, 2004

(30) Foreign Application Priority Data

Jun. 17, 2003    (JP)    ............................. 2003-172345

(51) Int. Cl.
- *B32B 37/00* (2006.01)
- *G02F 1/1339* (2006.01)
- *G02F 1/1341* (2006.01)

(52) U.S. Cl. ...................................... 156/145; 349/189
(58) Field of Classification Search ................ 156/145; 349/189

See application file for complete search history.

(56) References Cited

U.S. PATENT DOCUMENTS 6,671,029 B1    12/2003    Choi

FOREIGN PATENT DOCUMENTS

| JP | 62-147427 A | * | 7/1987 |
|---|---|---|---|
| JP | 2-87114 | | 3/1990 |
| JP | 05-66408 A | * | 3/1993 |
| JP | 7-318954 | | 12/1995 |
| JP | 09-258238 A | * | 10/1997 |
| JP | 2000-162621 | | 6/2000 |
| JP | 2002-296606 A | * | 9/2002 |
| JP | 2002-341308 A | * | 11/2002 |
| KR | 2001-0039347 | | 5/2001 |
| KR | 2002-0021893 | | 3/2002 |

* cited by examiner

*Primary Examiner*—Jeff H Aftergut
(74) *Attorney, Agent, or Firm*—Oblon, Spivak, McClelland, Maier & Neustadt, P.C.

(57) ABSTRACT

A method of manufacturing a liquid crystal display panel is provided which includes bonding a pair of substrates to each other with a gap maintained therebetween and defining an intake between the substrates, injecting liquid crystal into a space between the substrates through the intake in an environment heated in comparison with room temperature, and sealing the intake by a sealant, with the environment kept heated from the injecting of the liquid crystal.

6 Claims, 3 Drawing Sheets

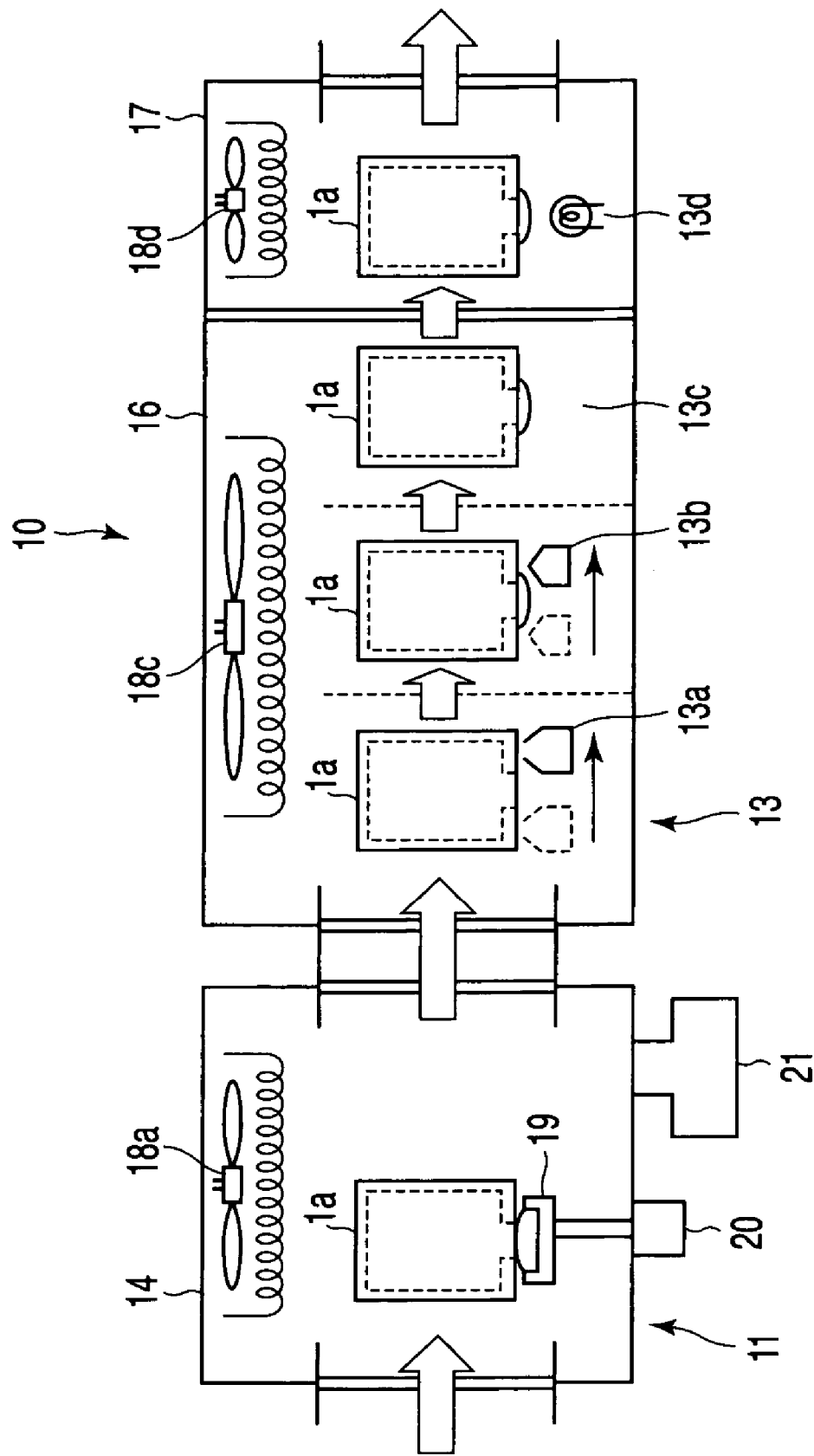
F I G. 5

METHOD OF MANUFACTURING LIQUID CRYSTAL DISPLAY PANEL AND LIQUID CRYSTAL DISPLAY PANEL MANUFACTURING APPARATUS

CROSS-REFERENCE TO RELATED APPLICATIONS

This application is based upon and claims the benefit of priority from prior Japanese Patent Application No. 2003-172345, filed Jun. 17, 2003, the entire contents of which are incorporated herein by reference.

BACKGROUND OF THE INVENTION

1. Field of the Invention

This invention relates to a method of manufacturing a liquid crystal display panel and a liquid crystal display panel manufacturing apparatus.

2. Description of the Related Art

Generally, a liquid crystal display panel is formed by superposing a pair of glass substrates with spacers interposed therebetween, bonding the substrates with a frame-shaped sealing member, and injecting liquid crystal into a space surrounded by the sealing member and the substrates. The spacers are arranged between the pair of substrates to keep a gap between the substrates uniform with a predetermined thickness. Thereby, a uniform display quality over the whole screen is secured. As the spacers, used are spherical spacers such as plastic beads scattered on a substrate, rod spacers such as glass fibers, or columnar spacers arranged in desirable parts on the substrate by photolithography in which photo-sensitive resin is applied on the substrate and subjected to exposure and development.

In a method of manufacturing a liquid crystal display panel having the above structure, two substrates in each of which transparent electrodes and alignment films are formed are bonded together, and thereafter liquid crystal is injected into the space between the substrates. A vacuum method is used as a general liquid crystal injecting method. In the vacuum method, first, an empty display panel with a liquid-crystal intake opened is arranged in a vacuum apparatus, and the display panel is evacuated. In this state, the liquid-crystal intake is immersed in a liquid crystal boat filled with liquid crystal, and then the pressure is gradually returned to atmospheric pressure to inject the liquid crystal into the display panel. Further, proposed is a method of shortening the injecting time by raising the temperature of the display panel during injection of liquid crystal under atmospheric pressure to lower viscosity of the liquid crystal. This method is called heating injection.

After the liquid crystal injecting step, the liquid-crystal intake is sealed. As disclosed in, for example, Jpn. Pat. appln. KOKAI publication NO. 2-87114, the sealing method is pressurizing sealing method in which the liquid-crystal intake is sealed in the state where the liquid-crystal-injected display panel is pressurized. Further, Example of the sealing method is heating sealing method in which the liquid-crystal intake is sealed in the state where the liquid-crystal-injected display panel is heated.

Usually, display panels are carried at room temperature (about 25° C.) from injecting step to sealing step. Therefore, when a liquid crystal display panel subjected to heating injection is put into the sealing step, the temperature of the liquid crystal display panel falls to about room temperature.

According to the liquid crystal display panel structured as described above, in environments of room temperature, the gap between the substrates is kept uniform by the spacers, and the thickness of the liquid crystal held in between the substrates is kept uniform in each part. Therefore, the liquid crystal display panel can perform good image display.

However, spacers and liquid crystal forming liquid crystal display panel expand in high-temperature environments. In particular, the expansion coefficient of liquid crystal is much greater than those of spacers and glass and the like. If the panel is used in high temperature environments, unevenness in display occurs due to the difference in the expansion coefficient.

Generally, the coefficient of linear expansion of columnar spacers containing pigments is about $0.8 \times 10^{-4}$ [/° C.] or less, while the coefficient of linear expansion of liquid crystal is $2.5 \times 10^{-4}$ [/° C.]. For example, supposing that the gap between the substrates of a liquid crystal display panel at normal temperature (room temperature) is 5.00 [μm], under a high-temperature of 50° C., the columnar spacers expand to have the height of 5.01 [μm], while the thickness of the thermal-expanded liquid crystal layer is 5.10 [μm].

Therefore, the thermal-expanded liquid crystal presses the substrates outward, and the substrates are deformed to bulge out. As a result, the spacers held between the substrates are separated from the substrates, and lose the function of maintaining the gap between the substrates. Further, the liquid crystal increased in volume by thermal expansion moves in the panel, and the space between the substrates is deformed to wave.

If the liquid crystal display panel in this state is vertically stood up, the liquid crystal increased in volume in the liquid crystal layer gathers in a lower portion of the liquid crystal display panel due to its own weight. As a result, the thickness of the liquid crystal layer increases in the lower portion of the liquid crystal display panel, and thereby unevenness in display occurs in image display and the display quality deteriorates.

To solve such a problem, in the sealing step, the liquid crystal intake is sealed after pressurizing the panel to discharge excess liquid crystal. In such a case, the liquid crystal is discharged from the narrow liquid crystal intake. Therefore, it takes at least 1 hour to discharge the excess liquid crystal, and all the discharged liquid crystal is discarded and wasted.

This invention has been made in view of the above points. The object of the present invention is to provide a method and an apparatus of manufacturing a liquid crystal display panel which can constantly maintain a good display quality without being influenced by the temperature of its use environment.

BRIEF SUMMARY OF THE INVENTION

To solve the above problem, a method of manufacturing a liquid crystal display panel according to an aspect of the present invention comprises:

bonding a pair of substrates to each other with a gap maintained therebetween, and defining an intake between the substrates;

injecting liquid crystal into a space between the substrates through the intake in an environment heated in comparison with room temperature; and sealing the intake by a sealant, with the environment kept heated from the injecting of the liquid crystal.

Further, a liquid crystal display panel manufacturing apparatus according to another aspect of the present invention comprises:

a chamber including a liquid crystal boat to inject liquid crystal into a space between a pair of substrates, an applying mechanism which applies a sealant to the pair of substrates, and a heater.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a plan view of a modification of the manufacturing apparatus according to the embodiment of the present invention, which comprises an injecting device and a sealing device.

DETAILED DESCRIPTION OF THE INVENTION

A manufacturing method and a manufacturing apparatus of a liquid crystal display panel according to embodiment of the present invention will now be explained in detail with reference to drawings.

First, explained is a structure of a liquid crystal display panel manufactured by the manufacturing method.

Figure 2:
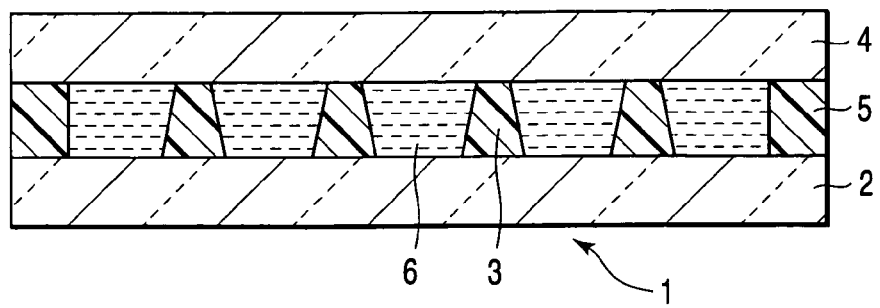
FIG. 2 is a cross-sectional view of a liquid crystal display panel at normal temperature according to the embodiment of the present invention.
Figure 3:
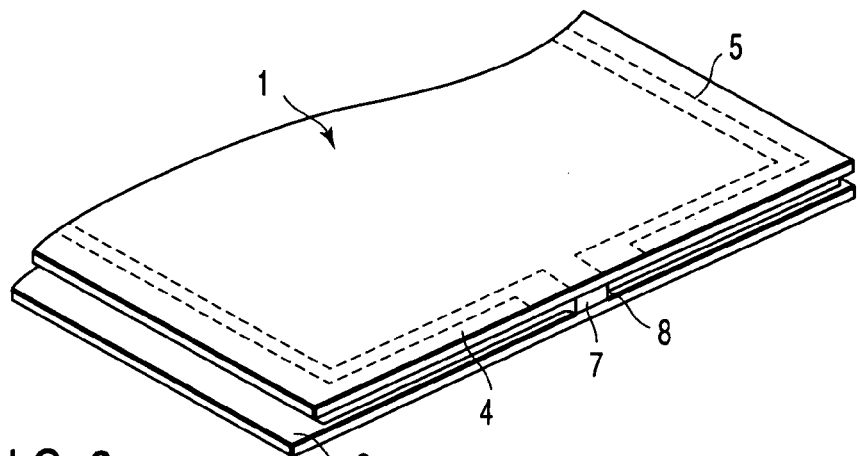
FIG. 3 is a perspective view of the liquid crystal display panel shown in FIG. 2.

As shown in FIGS. 2 and 3, a liquid crystal display panel 1 comprises a first substrate 2 and a second substrate 4 which are arranged opposite to each other. The first substrate 2 and the second substrate 4 are held, with a predetermined gap between them, by a plurality of columnar spacers 3 formed on one of the substrates. The first substrate 2 is provided with gate wirings, source wirings, switching elements, pixel electrodes and an alignment film, which are not shown. Further, the second substrate 4 is provided with a common electrode and an orientation film, which are not shown.

Edge portions of the first and the second substrates 2 and 4 are bonded by a frame-shaped sealing member 5. A liquid crystal intake 7 is formed in the sealing member. Liquid crystal is injected in an area enclosed by the first substrate 2, second substrate 4 and the sealing member 5 to form a liquid crystal layer 6. The liquid crystal intake 7 is sealed with a sealant 8.

Next, detailed are the manufacturing method and the manufacturing apparatus of the liquid crystal display panel structured as described above.

Figure 1:
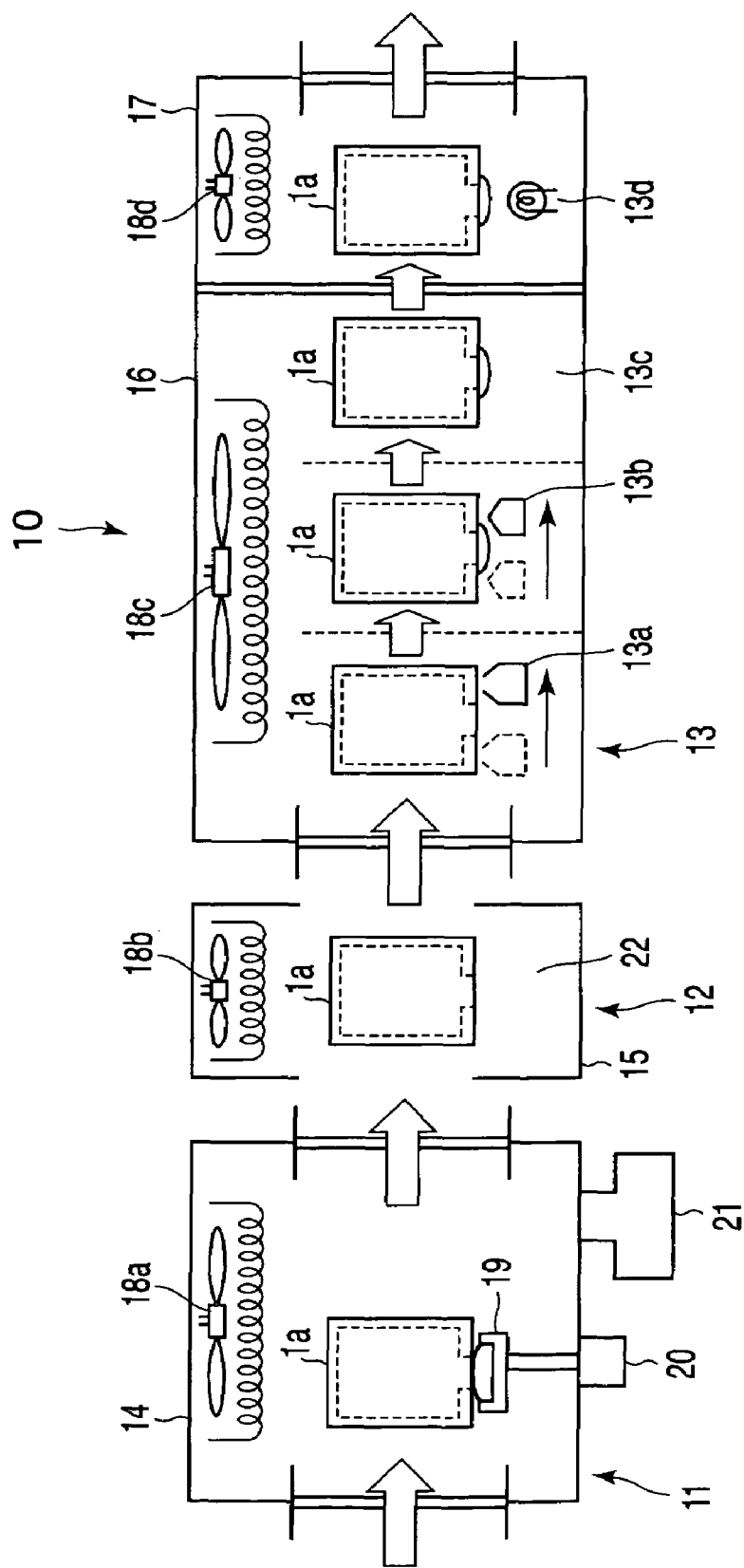
FIG. 1 is a plan view of a manufacturing apparatus comprising an injecting device, a carrying mechanism and a sealing device, according to an embodiment of the present invention.

As shown in FIG. 1, a manufacturing apparatus 10 which manufactures the liquid crystal display panel 1 comprises an injecting device 11 which performs liquid crystal injection, a sealing device 13 which performs sealing, and a carrying mechanism 12 which carries a liquid crystal display panel between the injecting device and the sealing device.

The injecting device 11 comprises an injecting chamber 14 which functions as a liquid crystal injecting chamber for holding an empty display panel 1a and liquid crystal. In the injecting chamber 14, a heater 18a serving as first heating means and a liquid crystal boat 19 are provided. The injecting device 11 also has a liquid crystal feeder 20 which feeds liquid crystal to the liquid crystal boat 19, and an evacuating device 21 for evacuating the injecting chamber 14 and the display panel 1a set in the injecting chamber.

The sealing device 13 comprises an applying chamber 16 which holds the display panel 1a injected with liquid crystal. In the applying chamber 16 serving as an application chamber, provided are a liquid crystal wiping section 13a, an applying mechanism 13b which applies the sealant 8 to the panel, a waiting section 13c, and a heater 18c serving as second heating means for heating the inside of the applying chamber. The sealing device 13 also has a curing chamber 17 which functions as an ultraviolet irradiation chamber. In the curing chamber 17, provided are an ultraviolet irradiating section 13d and a heater 18d serving as heating means for heating the inside of the curing chamber.

The carrying mechanism 12 has a carrier 15 which is provided to be movable between the injecting chamber 14 and the applying chamber 16. In the carrier, a carrying chamber 22 serving as a carrying chamber which holds the display panel 1a is formed. Further, the carrier 15 is provided with a heater 18b which heats the inside of the carrying chamber 22. As a modification of the above manufacturing apparatus 10, there may be no carrying mechanism 12, and the injecting chamber 14 and the applying chamber 16 may directly communicate with each other. Further, the manufacturing apparatus may have a structure in which one chamber contains the liquid crystal boat 19, the liquid crystal wiping section 13a and the applying mechanism 13b, and a common heater which heats them is provided.

Next, detailed is a method of manufacturing the liquid crystal display panel 1 which is manufactured by the manufacturing apparatus 10 structured as described above.

First, an empty display panel 1a is prepared and carried into the injecting chamber 14. Here, the empty display panel 1a has the first substrate 2 and the second substrate 4 bonded by the sealing member 5, and its liquid crystal intake 7 formed in the sealing member 5 is opened. After the empty display panel 1a is carried, the display panel is injected with liquid crystal in the injecting chamber 14. In this step, first, the evacuating device 21 evacuates the injecting chamber 14 and the display panel 1a disposed in the injecting chamber.

Then, the liquid crystal intake 7 of the display panel 1a is immersed in liquid crystal put in the liquid crystal boat 19. In this state, the atmosphere in the injecting chamber 14 is gradually returned to atmospheric pressure. Thereby, liquid crystal is injected from the liquid crystal intake 7 into the display panel 1a by using capillary action.

Further, when the liquid crystal is injected, the heater 18a is operated to heat the atmosphere inside the injecting chamber 14 and maintain the injecting temperature to be not less than a maximum use temperature of the liquid crystal display panel 1 in the range of its use temperature. The injecting temperature may be a temperature being 5° C. less than the maximum use temperature. Here, The maximum use temperature of the liquid crystal display panel 1 is a maximum temperature in the range of temperature at which the liquid crystal display panel is used. In this embodiment, the atmosphere in the injecting chamber 14 is controlled to be 50±5° C. on the assumption that the maximum use temperature is 50° C.

By heating the inside of the injecting chamber 14 as described above, the display panel 1a into which liquid crystal is to be injected is also heated and maintained at an injecting temperature of 50±5° C. Further, the liquid crystal to be injected into the display panel 1a is also heated to the injecting temperature simultaneously with injecting, and injected in the thermal-expanded state into the display panel.

By the above step, the area enclosed by the two substrates of the display panel 1a and the sealing member 5 is filled with the expanded liquid crystal, and injection is completed. During the injection, the display panel 1a and the injected liquid crystal are maintained at the injecting temperature. Injecting the liquid crystal in the heated state can reduce the viscosity of the liquid crystal and shorten the injecting time. In the above injecting step, the liquid crystal is heated through the display panel 1a. However, it is also possible to heat the liquid crystal itself to the injecting temperature, and thereafter inject it into the empty display panel. For example, the liquid crystal being more expanded than the liquid crystal at room temperature may be injected into the display panel.

After completion of liquid crystal injection, the display panel 1a is carried from the injecting device 11 into the carrying chamber 22 of the carrying mechanism 12. The atmosphere in the carrying chamber 22 is maintained in advance at a carrying temperature of 50±5° C. by the heater 18b. Then, the carrying chamber 22 holding the display panel 1a injected with liquid crystal is carried by the carrier 15 from the injecting device 11 to the sealing device 13, and thereafter the display panel is carried from the carrying chamber into the applying chamber 16.

Thereby, the display panel 1a and the liquid crystal injected therein are sent, in the state maintained at the maximum use temperature after liquid crystal injecting, from the injecting chamber 14 to the applying chamber 16. The atmosphere in the applying chamber 16 is maintained in advance at an applying temperature of 50±5° C. by the heater 18c. The inside of the applying chamber 16 is maintained at atmospheric pressure, and it is not necessary to apply any specific pressure to the display panel 1a.

Next, the liquid crystal intake 7 of the display panel 1a is closed in the applying chamber 16. In this step, first, the liquid crystal wiping section 13a wipes away excess liquid crystal remaining on the liquid crystal intake 7. Then, the applying mechanism 13b applies a sealant 8 to the liquid crystal intake 7 to close the liquid crystal intake. Since the sealant 8 is applied after wiping away the liquid crystal attached to the liquid crystal intake, excellent application can be performed. Wiping away the liquid crystal as described above produces a space, into which the sealant 8 is took in, in the liquid crystal intake. As the sealant 8, for example, an ultraviolet-curing sealant is used. By the above step, the liquid crystal intake 7 of the display panel 1a is sealed by the sealant 8 in the state where the injected liquid crystal is maintained at the maximum use temperature and thermal-expanded.

Figure 4:
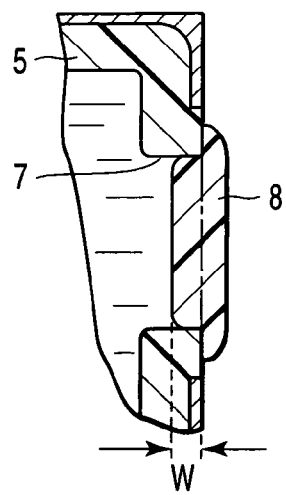
FIG. 4 is a schematic diagram of the liquid crystal display panel, illustrating a liquid crystal intake, in particular, a sealant suction width.

After the liquid crystal intake 7 is sealed by the sealant 8, the display panel 1a is moved to the waiting section 13c. Then, the heater 18c changes the atmosphere in the applying chamber 16 from the applying temperature to a waiting temperature of, for example, 55±5° C. In this state, the display panel 1a is held in the waiting section 13c for a predetermined time to adjust an suction width W of the sealant 8 with respect to the liquid crystal intake 7, as shown in FIG. 4. Here, The suction width W can be controlled to a desired value by adjusting the waiting temperature, or controlling the viscosity of the liquid crystal injected into the display panel 1a. Although the temperature is changed during the waiting time after the liquid crystal intake 7 is sealed with the sealant in this embodiment, the temperature may have been already changed when the sealant 8 is applied. The step "forming the sealant" in this embodiment includes both application and the waiting time after application.

Supposing that the waiting temperature or the temperature in application is set to 100° C. which is 50° C. higher than the injecting temperature, the suction width W of the sealant 8 is 0.0 mm. If the waiting temperature or the temperature in application is equal to or higher than the injecting temperature like this, the liquid crystal in the display panel 1a further expands and pushes the applied sealant 8 out of the liquid crystal intake 7. Therefore, the suction width W is narrowed.

In the meantime, supposing that the waiting temperature or the temperature in application is set to 30° C. which is 20° C. lower than the injecting temperature, the suction width W of the sealant 8 is 5.0 mm. Specifically, if the waiting temperature or the temperature in application is lower than the injecting temperature, the liquid crystal in the display panel 1a contracts, and the sealant 8 applied to the liquid crystal intake 7 is taken into the liquid crystal intake 7. Thereby, the suction width W of the sealant 8 is broadened.

If the waiting temperature or the temperature in application is controlled within the range of −20° C. to +50° C. in comparison with the injecting temperature as described above, the suction width W can be adjusted within the range of 0.0 mm to 5.0 mm. The suction width W is preferably controlled within the range of 0.1 mm to 1.0 mm. This is because the first substrate 2 and the second substrate 4 in the vicinity of the liquid crystal intake 7 are provided with a display area for image display, and thus a too broad suction width W has an adverse effect on image display. In this embodiment, the injecting temperature is set to 50+5° C., and the waiting temperature or the temperature in application is set to 55+5° C., and thereby the suction width W of the sealant 8 is controlled to 0.9 mm. Therefore, the suction width W of the sealant 8 in the liquid crystal intake 7 can be controlled by changing the temperature in injection of the liquid crystal to a temperature in sealing of the liquid crystal intake. The temperature in sealing of the liquid crystal intake 7 is different from the temperature in injection of the liquid crystal.

After the suction width W of the sealant 8 is controlled, the display panel 1a is carried from the applying chamber 16 into the curing chamber 17. The atmosphere in the curing chamber 17 is maintained in advance at a curing temperature of 55±5° C. by the heater 18d. Specifically, the curing temperature is adjusted to a temperature equal to the waiting temperature.

Next, in the curing chamber 17, the sealant 8 applied to the liquid crystal intake 7 is cured to seal the intake. In this step, the ultraviolet irradiating section 13d irradiates the sealant 8 with ultraviolet rays. This cures the sealant 8 in the state of keeping the suction width W which has been adjusted in the waiting section 13c. Thereby, the liquid crystal intake 7 is sealed, and the liquid crystal display panel 1 injected with the expanded liquid crystal is finished.

According to the method and the apparatus of manufacturing the liquid crystal display panel according to the embodiment of the present invention, structured as described above, the liquid crystal display panel 1 is formed by injecting liquid crystal heated to a temperature higher than the maximum use temperature into the empty display panel 1a and sealing the liquid crystal intake 7, with the temperature of the liquid crystal in injection maintained. Thereby, the liquid crystal display panel 1 is held with thermal-expanded liquid crystal of a proper quantity corresponding to the volume in the liquid crystal display panel. Therefore, even if the liquid crystal display panel 1 is used at any temperature within the range of the use temperature, the liquid crystal layer is maintained at uniform thickness over the whole liquid crystal display panel, and good display quality is constantly maintained.

For example, if the liquid crystal display panel 1 is used in an environment of the maximum use temperature, each constituent element such as liquid crystal and the columnar spacers 3 expands by heat. However, as described above, the liquid crystal held in the liquid crystal display panel 1 is set to a proper amount in the thermal-expanded state heated to a temperature higher than the maximum use temperature. Therefore, even if the liquid crystal expands in a high temperature environment, no excess liquid crystal exists in the liquid crystal display panel 1, and it is possible to prevent such a defect that the first substrate 2 and the second substrate 4 are deformed by being pressed outward by the expanded liquid crystal. Therefore, the first and second substrates 2 and 4 are constantly kept in contact with the spacers, and the gap between the first and the second substrates is maintained at a predetermined value by the spacers. For example, even if the liquid crystal display panel 1 is vertically stood up, the thickness of the liquid crystal layer 6 is maintained uniform over the whole liquid crystal display panel, and good image display is possible with display quality retained. Therefore, it is possible to obtain a liquid crystal display panel 1 which prevents occurrence of unevenness in display and maintains good display quality in any temperature within the range of the use temperature.

Further, according to the method of manufacturing a liquid crystal display panel according to the embodiment, when sealing the liquid crystal intake 7, it is unnecessary to discharge excess liquid crystal from the liquid crystal intake by pressing, as performed in the prior art. Therefore, the lead time is shortened and manufacturing efficiency is increased. Simultaneously, waste liquid crystal is reduced, and the efficiency in use of liquid crystal as material is increased.

Further, in the sealing step, the temperatures of the heaters 18c and 18d are controlled within a range of 20° C. lower to 50° C. higher than the temperature of the panel in the liquid crystal injecting step. Thereby, the suction width W of the sealant 8 is adjusted to an optimum value, and the liquid crystal intake 7 is sealed with reliability.

In the above embodiment, explained is the case where the liquid crystal display panel is manufactured with the maximum use temperature of 50° C. However, the maximum use temperature is not limited to 50° C., but may be changed to any desired value, for example, 80° C. Even if the maximum use temperature is set to 80° C., the injecting step, the applying step and the sealing step can be performed in the same manner as the above. However, the maximum use temperature is preferably set to be equal to or higher than the boiling point of liquid crystal.

In the above embodiment, the injecting temperature, the carrying temperature and the applying temperature are set to the maximum use temperature ±5° C. Further, the carrying temperature and the applying temperature are preferably the same as or higher than the injecting temperature.

Also with respect to other points, the present invention is not limited to the above embodiment, but can be variously modified within the scope of the invention. For example, as shown in FIG. 5, the manufacturing apparatus 10 may be formed by directly connecting the injecting device 11 with the sealing device 13 such that they communicate with each other. According to this structure, a carrying mechanism between the injecting device 11 and the sealing device 13 can be omitted, and the manufacturing apparatus 10 is miniaturized. Further, when the display panel 1a is carried from the injecting device into the sealing device, this structure prevents decrease in the temperature of the injected liquid crystal, and shortens the lead time.

In the above manufacturing apparatus 10 of FIG. 5, the other structures thereof are the same as those in the above embodiment. Like constituent elements are denoted by like reference numerals, and detailed explanations thereof are omitted.

Further, the sealant 8 is not limited to ultraviolet-curing materials, but can be selected according to circumstances. Various means for curing the sealant 8 can be selected according to the adopted sealant.

Wiping of the liquid crystal may be performed with the liquid crystal being more expanded than the liquid crystal at room temperature. The suction width of the sealant in the intake may be controlled by changing an expanded state of the liquid crystal in injection of the liquid crystal to an expanded state of the liquid crystal in sealing of the intake. The liquid crystal in sealing of the intake may be more expanded than the liquid crystal in injection of the liquid crystal.

What is claimed is:

1. A method of manufacturing a liquid crystal display panel, comprising:

bonding a pair of substrates to each other with a gap maintained therebetween, and defining an intake between the substrates;

injecting liquid crystal into a space between the substrates through the intake in an environment heated in comparison with room temperature;

sealing the intake by a sealant, with the environment kept heated from the injecting of the liquid crystal; and controlling a suction width of the sealant in the intake by changing a temperature of the environment during the sealing of the intake to a temperature higher than the temperature during the injecting of the liquid.

2. A method according to claim 1, further comprising:

wiping away a liquid crystal adhering to the intake after the injecting of the liquid crystal, wherein the wiping of the liquid crystal is performed in an environment heated in comparison with room temperature.

3. A method according to claim 1, wherein the sealing of the intake is performed under atmospheric pressure.

4. A method of manufacturing a liquid crystal display panel, the method comprising:

bonding a pair of substrates to each other with a gap maintained therebetween, and defining an intake between the substrates;

injecting liquid crystal into a space between the substrates through the intake, the liquid crystal being more expanded than the liquid crystal at room temperature;

sealing the intake by a sealant, with the liquid crystal kept expanded from the injecting of the liquid crystal; and controlling a suction width of the sealant in the intake by changing an expanded state of the liquid crystal during the sealing of the intake to an expanded state more expanded than the state of the liquid crystal during the injecting of the liquid crystal.

5. A method according to claim 4, further comprising:

wiping away a liquid crystal adhering to the intake after the injecting of the liquid crystal, wherein the wiping of the liquid crystal is performed with the liquid crystal being more expanded than the liquid crystal at room temperature.

6. A method according to claim 4, wherein the sealing of the intake is performed under atmospheric pressure.

* * * * *